United States Patent Office 3,676,206
Patented July 11, 1972

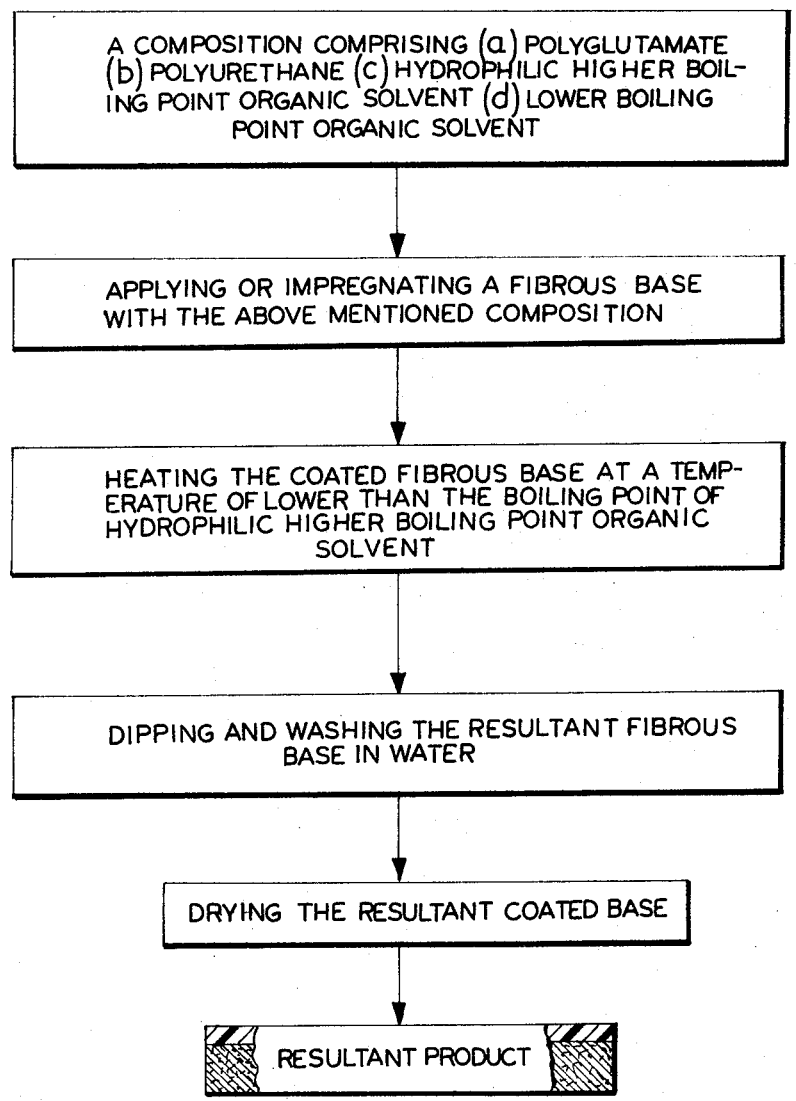

3,676,206
POROUS COATED FIBROUS MATERIAL
Kazuo Nishitani, Kainan, and Yasuhiro Shiga and Yoshifumi Nishibayashi, Osaka-fu, Japan, assignors to Toyo Cloth Co., Ltd.
Filed June 27, 1969, Ser. No. 837,184
Claims priority, application Japan, July 2, 1968, 43/46,134
Int. Cl. C08c 17/08
U.S. Cl. 117—140 A                    10 Claims

ABSTRACT OF THE DISCLOSURE

A natural leather-like product having a high moisture permeability and moisture release, an elastic plasticity, and a peculiar hand is prepared by applying or impregnating a porous coated fibrous material with a solution of blended composition of polyglutamate and polyurethane and treating it by the wet coagulation method.

---

The present invention relates to a process for preparing a porous coated fibrous material by applying or impregnating with a solution of blended composition of polyglutamate and polyurethane on a fibrous base and treating it by the wet coagulation method. And also the present invention relates to a natural leather-like product having a highly moisture permeability and moisture release, and elastic plasticity, and a peculiar hand.

The process for preparing fibers and films from alpha-aminoacid polymer by the wet coagulation method has been well known. For example, in the specification of British Pat. No. 935,396 there is described a process for the manufacture of films composed of polymers consisting essentially of an optically active form of gamma-methyl glutamate or gamma-ethyl glutamate which comprises polymerizing an optically active gamma-methyl or gamma-ethyl glutamate N-carboxy anhydride in an organic liquid medium which is a solvent for the polypeptide formed, the polypeptide being composed of at least 90 percent by weight of units of the optically active glutamate ester, extruding a solution of the polypeptide through a slit into a setting medium, and stretching the resultant film and substantially orienting it in the direction of stretching. For the purpose of manufacturing fibers and films, a solution of the polypeptide is coagulated to be formed to a shape of fiber or film and thereafter the resulting formed product is stretched to increase its strength. The product is required to have a dense micro-structure. Alternatively, for the purpose of manufacturing coated materials, the product is required to have a moisture permeability and air permeability as well as a softness, and, therefore, a coated material having excellent properties cannot be obtained by such method of manufacturing fibers or films.

The specification of British Pat. No. 1,115,488 discloses an artificial leather comprising a base material coated or impregnated with a synthetic aminoacid polymer and a process for the production of such a leather substitute, i.e. a process for producing an artificial leather wherein a base material is coated or impregnated with a solution of a synthetic aminoacid polymer and the solvent is evaporated. The product obtained by such dry coagulation method is poor in feeling and hand is not natural leather-like.

An object of the present invention is to provide a novel porous coated fibrous material coated or impregnated with a mixture of polyglutamate and polyurethane.

Another object of the present invention is to provide an industrial process for manufacturing a novel coated fibrous material.

Further, another object of the present invention is to provide a novel leather-like product which is excellent in moisture permeability as well as softness by improving the defects of artificial leather obtained by coating or impregnating with polyglutamate alone.

Other objects will be clear from the following detailed description.

These objects have been accomplished according to the present invention by a process for obtaining a novel porous coated fibrous material, which comprises applying or impregnating with a composition composed of a mixture of polyglutamate and polyurethane and a hydrophilic higher boiling point organic solvent and lower boiling point organic solvent on a fibrous base, heating it at a temperature of below the boiling point of the hydrophilic higher boiling point organic solvent to remove the lower point organic solvent, subsequently dipping the applied or impregnated material into water and washed with water leach off the hydrophilic higher boiling point organic solvent and then drying.

The figure is a flow chart showing a process for manufacturing a porous coated fibrous material according to the present invention.

Polyglutamates to be used in the present invention are polymers which are polymerized with the optically active glutamate, and the structural unit may be represented by the formula

—NH—CH(—CH$_2$—CH$_2$—COOR)—CO— wherein R is an aliphatic alkyl radical such as methyl, ethyl, propyl, cetyl, dodecyl, n-octyl, 2-ethylhexyl, and the like, an alicyclic radical such as cyclohexyl, and an aromatic radical such as benzyl, and the polymer may be a copolymer, R comprising two kinds of radicals. And the degree of polymerization of the polyglutamates is preferably 200 to 3000. These polyglutamates can be improved in porosity required as the coated material by mixing polyurethane thereto. When using a polyglutamate wherein R is an aliphatic alkyl radical, alicyclic radical or aromatic radical having a number of carbon atoms, the obtained product can be provided with suitable elastic plasticity. The polyglutamate to be used in the present invention can be obtained by polymerizing an optically active gamma-glutamate by means of conventional process.

Polyurethanes to be used in the present invention are high molecular compounds obtained by chain-extending a polyether glycol or polyester with a diisocyanate. The polyether glycol includes polyethylene glycol, polypropylene glycol, polytetramethylene glycol, polyhexamethylene glycol, polyoctamethylene glycol, polynonamethylene glycol and polydecamethylene glycol, and their mixtures. The molecular weight of these polyether glycols is 100 to 4000, and preferably 150 to 2000.

Polyesters are obtained by reacting a glycol such as ethylene glycol, propylene glycol, tetramethylene glycol, decamethylene glycol, 2,2-dimethyl-1,3-propanediol, cyclohexanediol and xylene glycol, with a dibasic acid such as succinic acid, adipic acid, suberic acid, sebacic acid, terephthalic acid and hexahydrophthalic acid. The molecular weight of the polyesters is 100 to 3000, and preferably 200 to 2500.

Diisocyanates used for chain-extending the above polyether glycols or polyesters include hexamethylene-1,6-diisocyanate, toluylene-2,4-diisocyanate, methylene-bis(4-phenylene isocyanate), and tetrahydronaphthalene diisocyanate, and a hexamethylene diisocyanate is preferable. Polyurethane chain-extended by hexamethylene diisocyanate is excellent in mutual solubility with polyglutamate.

The polyurethanes can be obtained by reacting the above polyether glycol or polyester with a diisocyanate. The average molecular weight of the polyurethane to be used in the present invention is in the range of 400 to 100,000, desirably 700 to 50,000. If the product of the present invention is particularly required to have flexibility and softness, it is effective to use a polyether urethane.

The ratio of polyglutamate and polyurethane to be blended may be appropriately adjusted depending upon the kinds of polyglutamate and polyurethane which are actually used, although the polyurethane is usually used in the range of less than 200 parts, by weight, preferably less than 150 parts per 100 parts of polyglutamate.

The hydrophilic higher boiling point organic solvents used for dissolving polymers in the present invention are exemplified by dimethylformamide, dioxane, gamma-butyrolactone, dimethylacetoamide, etc., and the lower boiling point organic solvents are exemplified by trichloroethane, dichloropropane, tetrachloroethane, ethylacetate, methyl-ethyl ketone, methyl Cellosolve, tetrahydrofuran, etc. The lower boiling point organic solvents may be either hydrophilic or hydrophobic although such solvents should be mutually soluble with hydrophilic higher boiling point organic solvents.

The polyglutamate is commonly prepared by solution polymerization of N-carboxy-gamma-glutamate as a monomer in an organic solvent. Various kinds of solvents may be used alone or in admixture for solution polymerization. In general in many cases the solution polymerization is carried out using a hydrophilic higher boiling point organic solvent, wherein a solution of polyurethane dissolved in a lower boiling point organic solvent is added to a polyglutamate solution to obtain a solution of blended polymers. When the polymerization solvent used for preparing a polyglutamate is a mixture solvent of hydrophilic higher boiling point organic solvent and lower boiling point organic solvent, the composition of the present invention can be obtained by adding polyurethane to the resulting polyglutamate solution as it is. Alternatively, if the polymerization solvent of polyglutamate is a hydrophobic lower boiling point organic solvent, a solution of polyurethane dissolved in a hydrophilic higher boiling point solvent is added and mixed to a polyglutamate solution. The kind and amount of solvents to be used may be appropriately selected relating to the polymerization solvent for polyglutamate and the kinds and molecular weight of polyurethane.

The concentration of solid constituent in the above composition may be controlled by the treating method of fibrous base. That is, in case of applying a composition on the surface of fibrous base the concentration of solid constituent is 8 to 40%, by weight, and the viscosity of the composition is 2,000 to 100,000 centipoises, and in case of impregnating fibrous base in the composition the concentration of solid constituent is 5 to 25%, by weight, and the viscosity of the composition is less than 1000 centipoises. And also coloring agents, plasticizers, fillers and rubbers may be, if necessary, added to the composition and a water soluble inorganic salt such as sodium bicarbonate and sodium sulfate, etc. can be added thereto.

Fibrous bases to be used in the present invention include woven fabrics, knitted fabrics, non-woven fabrics, and fabrics the surface of which is raised, and laces, and non-sizing paper, etc., and the fiber forming the fibrous base may be either natural fibers or artificial fibers.

As a method of applying a composition on the fibrous base, it is desirable to apply the composition on the surface of fibrous base by means of rolls method, knife edge method, or casting method, or to dip the fibrous base in the composition and thereafter, if desirable, remove the excess of composition on one side by knife and on the other side by roll to impregnate the fibrous base therewith.

Next, the coated fibrous base treated with the composition is heated at a temperature of lower than the boiling point of hydrophilic higher boiling point organic solvent, preferably by lower at least 10° C., and of higher than the boiling point of lower boiling point organic solvent. By this heating the lower boiling point solvent is substantially evaporated off to increase the concentration of solid constituent in the coated layer up to the concentration as could not be obtained as a solution containing polyglutamate and polyurethane. And in case the concentration of solid constituent becomes to more than about 40%, by weight, the polyglutamate and polyurethane can be prevented from migration and layer separation caused by the difference of solidification velocity when dipping these coated layers in water, and a uniform coagulated layer can be formed. In general this heating temperature is 50 to 100° C.

By dipping the so obtained coated layer having higher polymer concentration in water, the hydrophilic higher boiling point organic solvent of coated layer is leached off and the polymers are coagulated. The temperature of dipping water may be generally an ordinary temperature, however, in case the composition is mixed with a water soluble inorganic salt, it is advantageous to wash the coated layer with hot water to make the salt be easily dissolved.

After dipping in water to sufficiently remove the hydrophilic higher boiling point organic solvent the coated layer is dried by the conventional method to obtain the product of the present invention.

The above product can be, if necessary, provided with a thin layer of synthetic resin on the surface of coagulated layer, applied various surface treatment, embossed, or dyed.

The coated fibrous material obtained according to the present invention is porous, rich in softness and flexibility, excellent in thermal resistance, aging resistance and water resistance, high in mechanical strength, moisture permeability, and has a natural leather-like appearance, tactile impression and hand.

The product of the present invention is suitable for puffing materials, sanitary materials, wall lining materials, interior materials and furniture materials, and one provided with a thin layer of synthetic resin on its surface is used as an artificial leather and has broader uses.

The present invention will be illustrated with the following examples in which "part" represents "part by weight."

Various characteristic values of the products in examples were determined by the following method:

Cold flex resistance was determined by measuring the numbers of stroke until the coated fibrous material of a piece of 4 cm. in width and 5 cm. in length was broken when the piece was folded double in the direction of length, hold at the respective position of one cm. from the both ends by two chucks and bended with a stroke of 2 cm. at a bending rate of 200±10 per minute at a temperature of −5° C.

Rubbing endurance, blocking, and color crocking resistance by dry cloth or perspirated cloth were determined according to the method specified in JIS–K–6772, color crocking resistance by wet cloth according to the method specified in JIS–L–1048, and moisture permeability according to the method specified in JIS–Z–0208.

Scratch was determined according to the Clemense method using a needle of 1 mm.$^2$.

Moisture absorbance was determined as a moisture content (in percentage) of sample when the sample was allowed to stand in an atmosphere of 25° C. and 65% RH for 24 hours and thereafter further allowed to stand in an atmosphere of 40° C. and 90% RH for 24 hours.

Moisture release was determined as a decrease of moisture content (in percentage) of sample when the sample was allowed to stand in an atmosphere of 40° C. and 90% RH for 24 hours and thereafter allowed to stand in an atmosphere of 25% C. and 65% RH for 24 hours.

Elongation recovery was determined as a recovery percentage of sample when the sample was elongated by 20% and, after allowed to stand for 24 hours as it was, was reluxed.

Flexibility was determined according to the heart loop method.

Stiffness was determined by measuring the length of bending of sample (a hanging length form the horizontal line) when the sample of 2.5 cm. x 10 cm. was fixed the length of 7 cm. on a rest and allowed the length of 3 cm. from the end to free state and loaded by 1.2 g. on the end.

EXAMPLE 1

A composition comprising 100 parts of poly-gamma-methyl D-glutamate, 75 parts of polyurethane (trademark Crisvon 6666, manufactured by Dai Nippon Ink and Chemicals, Inc.), 1000 parts of dichloroethane, 150 parts of dimethylformamide and 5 parts of carbon black was prepared.

The composition was applied on the surface of rayon twill fabric (warp 16s x 45, weft 30s/2 x 53) in thickness of 0.8 mm., and the coated fabric was placed in a furnace at 90° C. for 3 minutes to evaporate off dichloroethane, dipped in water at 27° C. for 30 minutes, and, after washing with hot water at 80° C. for 30 minutes to substantially leach off dimethylformamide, and then dried at 105° C. for 2 minutes to obtain a coated material which is rich in softness and flexibility and high in moisture permeability. The coated material is the optimum for puffing materials and medical materials.

EXAMPLE 2

A polymer solution comprising 100 parts of poly-gamma-methyl D-glutamate, 1200 parts of tetrachloroethane and 50 parts of dimethylformamide was added with 60 g. of methyl Cellosolve to be ester-exchanged. A composition comprising 100 parts of the resulting poly-gamma-methoxyethylmethyl D-glutamate having 20 mol percent of ester-exchanging rate of methoxyethyl radical, 120 parts of polyester urethane, 1200 parts of tetrachloroethane, 300 parts of dimethylformamide, 50 parts of methyl Cellosolve, 400 parts of sodium bicarbonate and 10 parts of prussian blue was prepared. The composition was applied on the surface of a knitted fabric with interlock stitch of 30s spun rayon yarn in 1100 stitches of gauge number in thickness of 0.7 mm., and the coated material was placed in a heating zone at 80° C. for 1.5 minute to evaporate off tetrachloroethane, dipped in hot water at 85° C. for 40 minutes to substantially remove dimethyl-formamide and sodium bicarbonate, and, after washing with water for 10 hours to completely remove dimethylformamide and sodium carbonate, a thermal decomposition product of sodium bicarbonate, and then dried at 104° C. to obtain a porous coated fibrous material suitable for an artificial leather.

The test results on characteristic values of resin layer obtained by applying the composition in Example 1 or 2 on a glass plate, heating to remove a lower boiling point organic solvent, dipping in water to leach off a higher boiling point organic solvent and drying, are shown in Table 1. The control in Table 1 is a resin layer obtained by applying a solution not mixing with polyurethane in the composition of Example 1 on a glass plate and treating in the same as in Example 1.

TABLE 1

|  | Example 1 | Example 2 | Control |
| --- | --- | --- | --- |
| Elongation | 292 | 118 | 53 |
| Young's modulus | 0.25 | 0.35 | 27.5 |
| Stiffness | 2.8 | 3.1 | 2.6 |

EXAMPLE 3

A composition comprising 100 parts of poly-gamma-methyl L-glutamate, 120 parts of polyether urethane which is a reaction product (average molecular weight 2200) of 3 moles of polyethylene glycol (average molecular weight 318) and 4 moles of hexamethylene-1,6-diisocyanate, 1200 parts of tetrachloroethane, 300 parts of gamma-butyrolactone, 50 parts of methyl Cellosolve, 400 parts of sodium bicarbonate and 10 parts of prussian blue was prepared.

The composition was applied on the surface of a knitted fabric with plain stitch in thickness of 0.9 mm., placed in a heating zone at 80° C. for 2 minutes to evaporate off tetrachloroethane, placed in a furnace at 110° C. for 1 minute to evaporate off methyl Cellosolve, and, thereafter, dipped in hot water at 85° C. for 40 minutes to substantially remove gamma-butyrolactone and sodium bicarbonate, and further washed with water for 10 hours to leach off gamma-butyrolactone and sodium carbonate, a thermal decomposition product of sodium bicarbonate, and then dried at 104° C. to obtain a coated matter suitable for a leather substitute.

EXAMPLE 4

A cotton twill fabric (warp 30s x 57, weft 20s/2 x 52) both sides of which was raised was dipped in a composition prepared in Example 2, and, after removing the excess of composition by applying a roll on one side and a knife edge on the other side, placed in a furnace at 80° C. for 2 minutes, and dipped in hot water at 60° C. for 10 minutes, in hot water at 70° C. for 20 minutes, and in hot water at 85° C. for 30 minutes to substantially evaporate off gamma-butyrolactone and methyl Cellosolve, and further washed with water for 5 hours, and then dried at 103° C. for 5 minutes. The product thus obtained was coated with a composition comprising 100 parts of poly-gamma-methyl D-glutamate, 40 parts of polyester urethane obtained by reacting polyester produced from 4 moles of ethylene glycol, 5 moles of propylene glycol and 8 moles of hexamethylene adipoamide with hexamethylene-1,6-diisocyanate, and 10 parts of dichloroethane and dichlorodiphenyl in a quantity of 30 g./m.$^2$ on the surface of the above coated fibrous base which had been previously removed the excess of composition, and which was then dried at 80° C. for 2 minutes to obtain an artificial leather.

EXAMPLE 5

A composition comprising 450 parts of poly-gamma-octyl L-glutamate, 150 parts of polyurethane (trademark Crisvon 6666, manufactured by Dai NiNppon Ink and Chemicals, Inc.), 44 parts of dioctylphthalate, 1500 parts of dichloropropane, 400 parts of dimethylacetamide, 100 parts of calcium carbonate and 5 parts of Chrome Yellow was prepared. A needle punched felt comprising poly-gamma-methyl glutamate fiber and having an apparent weight of 150 g./m.$^2$ was dipped in the above composition, squeezed by nip rolls to be impregnated with 100%, by weight, of the composition per fibrous base, placed on a glass plate, and after heating at 80° C. for 3 minutes, dipped in water at 23° C. for 1 hour, and, after washing with hot water at 60° C. for 3 hours, and then dried at 102° C. for 5 minutes to obtain an impregnated material being excellent in moisture permeability.

The characteristic values of the products obtained in the above examples are as shown in Table 2.

TABLE 2

| Example | 1 | 2 | 4 |
| --- | --- | --- | --- |
| Cold flex resistance (numbers) | >200,000 | 13,000 | 78,000 |
| Rubbing endurance | (1) | (1) | (1) |
| Scratch (g./mm.$^2$) | 100 | 100 | 200 |
| Blocking | None | None | None |
| Color crocking resistance: | | | |
| Wet cloth | 5 | 5 | 5 |
| Dry cloth | 5 | 5 | 5 |
| Perspirated cloth | 5 | 5 | 5 |
| Moisture permeability (mg./m.$^2$) | 2,230 | 2,470 | 2,020 |
| Moisture absorbance | 4.4 | 3.8 | 2.7 |
| Moisture release | 4.5 | 4.1 | 1.1 |
| Elongation recovery: | | | |
| 0.5 hour | 63.9 | 41.0 | 70.4 |
| 1 hour | 59.3 | 39.0 | 67.6 |
| 24 hours | 40.3 | 21.5 | 56.6 |
| Flexibility (mm.) | 57.0 | 66.0 | 41.5 |

[1] Not unusual.

It is to be understood that the present invention is not limited to the precise embodiments described above and that minor modifications and variations may be made within the scope of the invention.

What is claimed is:

1. A porous fibrous material coated or impregnated with a composition comprising (a) polyglutamate composed of an optically active glutamate, the repeating unit of which is of the formula

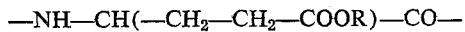

wherein R represents an aliphatic alkyl, alicyclic, or aromatic radical and (b) 33.33 to less than 200 parts by weight of polyurethane per 100 parts by weight of the polyglutamate, said composition being prepared by the wet-coagulation of a polymer solution containing the polyglutamate and the polyurethane dissolved in a mixture of a hydrophilic higher boiling point organic solvent and a mutually soluble lower boiling point organic solvent after the lower boiling point organic solvent has been removed by heating.

2. A porous coated fibrous material as set forth in claim 1, wherein R is methyl radical.

3. A porous coated fibrous material as set forth in claim 1, wherein R is ethyl radical.

4. A porous coated fibrous material as set forth in claim 1, wherein R is methoxyethyl radical.

5. A porous coated fibrous material as set forth in claim 1, wherein R is octyl radical.

6. A porous coated fibrous material as set forth in claim 1, wherein polyurethane is polyetherurethane produced from polyetherglycol and diisocyanate.

7. A porous coated fibrous material as set forth in claim 1, wherein polyurethane is polyesterurethane produced from polyester and diisocyanate.

8. A porous coated fibrous material as set forth in claim 1, wherein fibrous base is a knitted fabric.

9. A porous coated fibrous material as set forth in claim 1, wherein fibrous base is a nonwoven fabric.

10. A porous coated fibrous material as set forth in claim 1, wherein fibrous base is a raised fabric.

References Cited

UNITED STATES PATENTS 3,483,015  12/1969  Fukushima et al. _____ 117—63

FOREIGN PATENTS 935,396  8/1963  Great Britain.
1,115,488  5/1968  Great Britain.

MURRAY KATZ, Primary Examiner

B. D. PIANALTO, Assistant Examiner

U.S. Cl. X.R.

117—63, 143 A, 145, 161 KP; 260—33.8 UB, 858